(12) United States Patent
McCann

(10) Patent No.: US 7,472,002 B2
(45) Date of Patent: Dec. 30, 2008

(54) METHOD OF ESTIMATING VEHICLE WEIGHT BY DETERMINING VERTICAL OSCILLATION FREQUENCY

(75) Inventor: Gerard O. McCann, Kalamazoo, MI (US)

(73) Assignee: Dana Heavy Vehicle Systems, LLC, Toledo, OH (US)

( * ) Notice: Subject to any disclaimer, the term of this patent is extended or adjusted under 35 U.S.C. 154(b) by 531 days.

(21) Appl. No.: 11/168,746

(22) Filed: Jun. 28, 2005

(65) Prior Publication Data

US 2006/0293815 A1   Dec. 28, 2006

(51) Int. Cl.
*B60G 17/018* (2006.01)

(52) U.S. Cl. .......................................... 701/37; 701/38

(58) Field of Classification Search ............. 701/36–38, 701/70; 702/173–174; 73/579–580; 177/136
See application file for complete search history.

(56) References Cited

U.S. PATENT DOCUMENTS

| | | | |
|---|---|---|---|
| 3,508,623 A | 4/1970 | Greenstein | |
| 4,588,038 A * | 5/1986 | Takagi | 177/141 |
| 4,630,227 A | 12/1986 | Hagenbuch | |
| 4,854,407 A | 8/1989 | Wagner | |
| 5,002,343 A | 3/1991 | Brearley et al. | |
| 5,215,154 A | 6/1993 | Kirby | |
| 5,410,109 A * | 4/1995 | Tarter et al. | 177/136 |
| 5,610,372 A | 3/1997 | Phillips et al. | |
| 5,837,945 A | 11/1998 | Cornwell et al. | |
| 5,877,455 A | 3/1999 | Kyrtsos | |
| 5,929,388 A | 7/1999 | Uehara et al. | |
| 5,973,273 A | 10/1999 | Tal et al. | |
| 6,513,384 B1 | 2/2003 | Quibel et al. | |
| 6,646,210 B1 | 11/2003 | Wissing | |

* cited by examiner

*Primary Examiner*—Yonel Beaulieu
(74) *Attorney, Agent, or Firm*—Marshall & Melhorn, LLC

(57) ABSTRACT

A method of estimating at least a portion of the weight of a vehicle and its load by use of an on-board accelerometer is disclosed.

13 Claims, 2 Drawing Sheets

METHOD OF ESTIMATING VEHICLE WEIGHT BY DETERMINING VERTICAL OSCILLATION FREQUENCY

BACKGROUND OF THE INVENTION

It is important to know the weight of a vehicle during its operation to optimize control of it as the weight and conditions change. Vehicle weight may be a consideration, for example, during loading and unloading, compliance with vehicle load distribution regulations, as well as affecting the fuel efficiency of the vehicle.

Some examples of known methods to determine the weight of a vehicle are described below:

U.S. Pat. No. 5,877,455 teaches a system for determining the weight of a vehicle using accelerometers. A first accelerometer is supported on the front steering axle of the vehicle. The first accelerometer measures the vertical acceleration of the front steering axle. Each additional axle of the vehicle also supports an accelerometer to measure the vertical acceleration of each respective axle. All of the accelerometers are electrically linked to a central processor or electronic control unit. The first accelerometer produces a first signal when the vehicle is moving. The first signal is sent to the ECU. The other accelerometers also send signals that are combined to form a second signal. The first signal and the second signal are compared to determine the weight of the vehicle.

U.S. Pat. No. 5,973,273 provides for a method of determining the weight of a vehicle. The method comprises a single acceleration sensor used to measure vertical acceleration, however, additional acceleration sensors may also be used. In one embodiment, a single linear acceleration sensor is used to measure vertical acceleration of the vehicle and two angular sensors are used to provide pitch and roll data from the vehicle. The patent indicates that all three sensors can be combined into a single sensor unit located together on the vehicle. The sensors can be any type, including mechanical inertial or piezoelectric sensors. The linear sensor can be used to measure acceleration from which an oscillatory frequency can be derived, including vertical velocity. An estimated weight supported by the suspension system is calculated based upon the measured frequency taken together with the predetermined spring properties of the suspension. The sensor, or sensors, may be sensitive to particular frequencies, or filters may be used to remove frequencies caused by the engine or frequencies from other mechanical noise. The estimated weight can be made available via a display to the driver, recorded electronically or otherwise in a vehicle log, and/or serve as an input to other vehicle safety or control systems.

U.S. Pat. No. 6,646,210 teaches a sensor or sensors located on the sprung part of the vehicle, for example, on the vehicle chassis. The sensors are connected to a data storage unit that is located on the vehicle or it may be separate from the vehicle. The sensors register vertical acceleration of the spring vehicle component to which they are attached.

Notwithstanding these efforts, the known methods of vehicle weight determination are still cumbersome and expensive. More specifically, among the disadvantages of known methods are:

The requirement for several accelerometers and also the fact that the accelerometers have to be located at more than one location on the vehicle. Therefore, they cannot be contained within the ECU where the information is ultimately processed. This dictates a requirement for expensive wiring and connectors. This is especially the case since in many known systems, the accelerometers are located on the axles. Continuous suspension motion means that the wiring must be robust and suitable for continuous flexing. Further, in some methods disclosed in the art, acceleration behavior of the axles is strongly influenced by the air pressure in the tires. Even if this is very carefully checked, for example each morning, it changes due to temperature changes while the vehicle is in motion, thus introducing one or more factors which can cause error in weight determination.

Thus, it would be desirable to have an inexpensive system for continuously estimating the weight of an unpowered vehicle, particularly a semi-trailer vehicle which is easily installed and maintained.

SUMMARY OF THE INVENTION

The present invention relates to a method of estimating the sprung weight of a semi-trailer comprising providing an electronic control module mounted on the semi-trailer, which trailer has one or more springs that have an essentially constant spring rate. The method of the invention estimates a vertical oscillation frequency of the semi-trailer with one pre-existing vertical axis accelerometer mounted within the electronic control module and further utilizes the vertical oscillation frequency estimate and the essentially constant spring rate of the one or more springs to estimate the sprung weight of the semi-trailer. While the present invention has been found to function most effectively when there are no variations in the spring rate of the one or more springs, it is within the scope of the invention to estimate the sprung weight of a semi-trailer having imperfections in one or more springs which may cause some variability in spring rate, as well as "multi-rate" or "multi-stage" springs which have intended variations in spring rate.

BRIEF DESCRIPTION OF THE DRAWINGS

The invention is herein described, by way of example only, with reference to the accompanying drawings, wherein.

DETAILED DESCRIPTION OF THE PREFERRED EMBODIMENT

Figure 1:
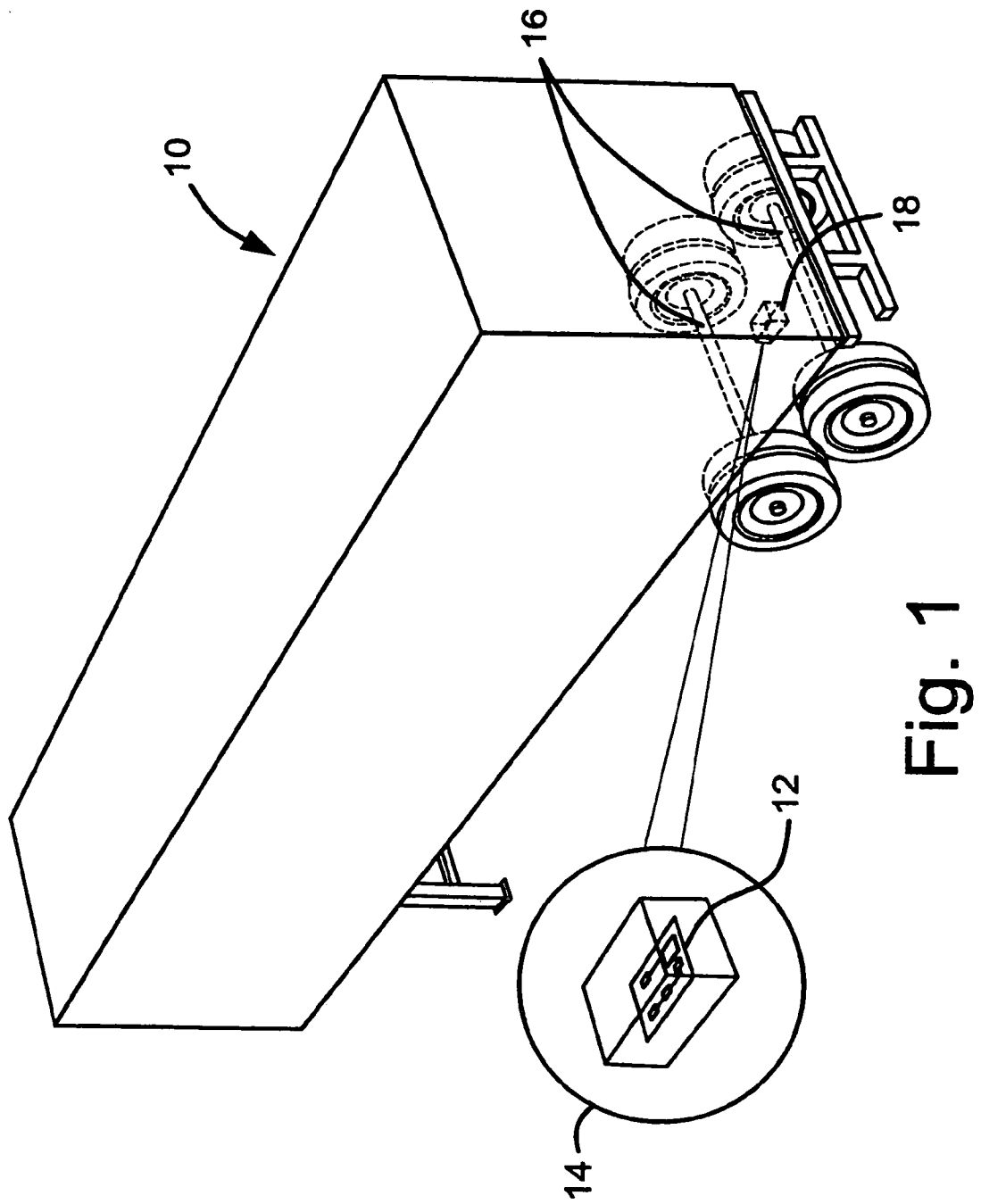
FIG. 1 is a perspective view of a semi-trailer having an on-board electronic control module containing one accelerometer.

The principles and operation of systems and methods according to the present invention may be better understood with reference to the drawings and the accompanying description.

The invention is a vehicle weight estimating method that is based on a determined vertical oscillation frequency of an unpowered vehicle such as a semi-trailer 10. The system utilizes an accelerometer 12 with sensitivity in at least the vertical axis. The accelerometer 12 is preferably housed within the control module 14 for ABS, EBS, Suspension and/or Roll Control on board the semi-trailer. The control module 14 can be configured to also use the signal from the accelerometer 12 to determine the approximate vertical oscillation frequency of the semi-trailer 10. An estimate of the approximate sprung vehicle weight can be calculated using the vertical oscillation data and by approximating the spring constant of the vehicle suspension.

For purposes of this application, by "sprung" weight is meant the weight of the semi-trailer frame, the trailer bed and enclosed containment area (if any) and any other components cushioned by the action of the springs, shock absorbers, etc.

In one embodiment of the present invention, this description applies to a portion of the trailer, namely, to the weight on the single, or closely co-located dual axles 16 at the rear of a semi-trailer 10. Those skilled in the art will readily appreciate that it can also apply to other portions of the trailer and/or the entire trailer.

As is well known, the weight of a semi-trailer 10 in both a loaded and unloaded state must be known accurately for purposes of compliance with state and federal transportation regulations. Such regulatory compliance is often determined by periodic weighing of large trucks and other heavy vehicles at state-operated weigh stations and the like.

By contrast, the subject invention comprises a method to continuously estimate the weight, preferably the sprung weight, of semi-trailer 10 on the single or closely co-located dual axles 16 in order to optimize control of the semi-trailer 10 when it is in motion by analysis of, primarily, the vertical oscillation frequency of the semi-trailer 10 under varying conditions of being unloaded, partially loaded, or fully loaded. Such estimated weight may not be sufficiently accurate to satisfy regulatory requirements.

More particularly, the method of the subject invention estimates the approximate weight on a single axle, or closely co-located pair of axles 16 by use of a vertical accelerometer 12 in a control module 14 which has been pre-positioned on the sprung mass adjacent 18 to the single axle, or to the center point of the co-located pair of axles 16. The vertical oscillation data and spring constants are utilized in, for example, an ABS, EBS, Roll Stability and/or suspension system to optimize control performance based on the estimated sprung weight on the subject axle or pair of axles 16. For example, an EBS system could optimize the braking torque for the load on the subject axles or axle pair 16.

In a microprocessor in the electronic control module 14, the spring constant or constants of the semi-trailer suspension components or suitable representations thereof, have already been entered. Data recorded by the vertical accelerometer is transferred via an electrical signal to the microprocessor where it is entered into a mathematical algorithm, which calculates the semi-trailer 10 weight. This information could be further compared with one or more set values for optimal control of the semi-trailer 10 under the then-existing conditions. While not part of the present invention, some type of warning could be conveyed to the operator of the vehicle if limits of safe operation were exceeded. Based on the information provided by the method of the present invention, the position of one or more axles/wheels/tires can be changed to provide more stable conditions when the trailer 10 is in motion, or during loading/unloading procedures.

Figure 2:
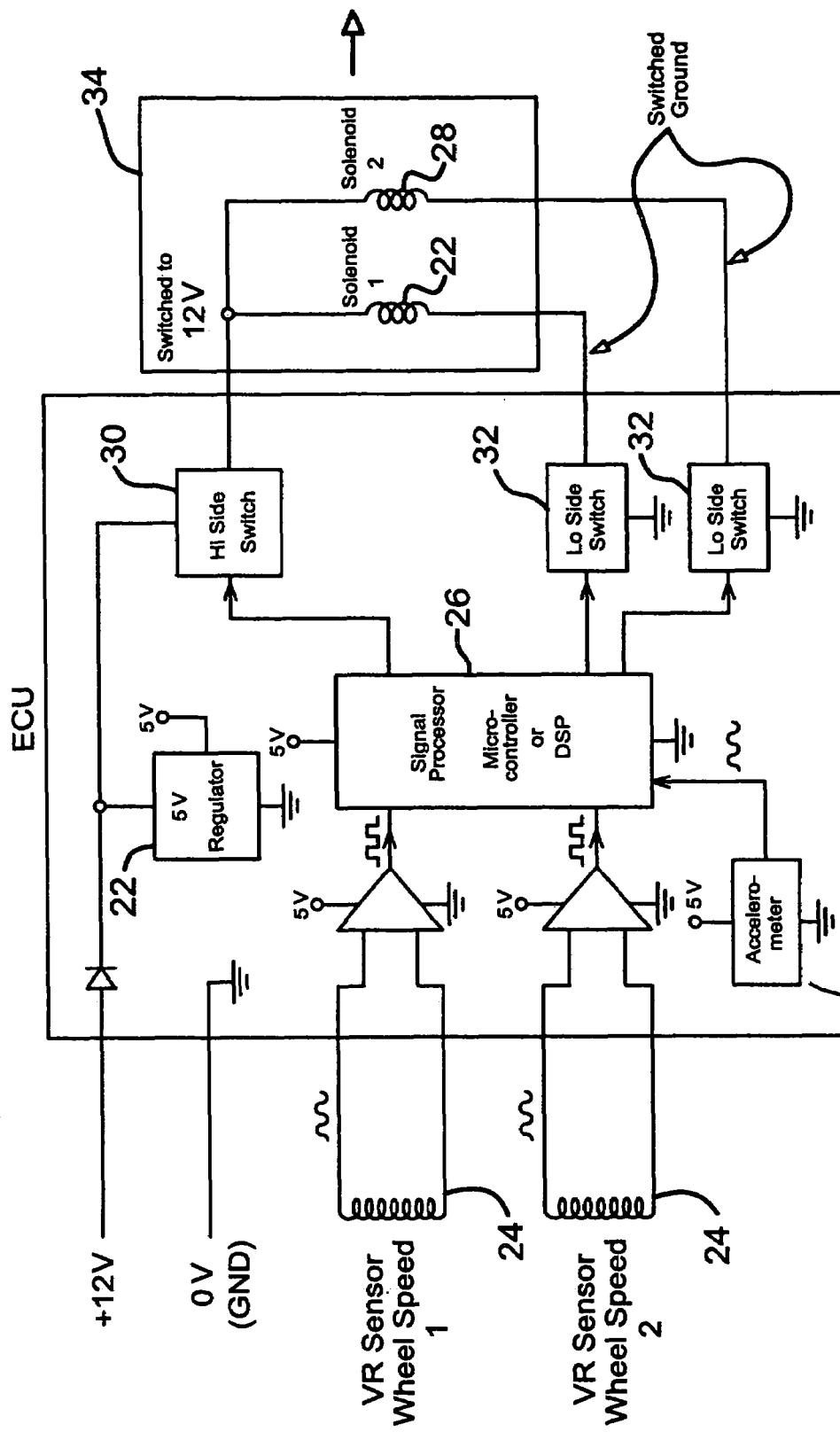
FIG. 2 is a schematic diagram of the invention as applied to an anti-lock braking system.

More specifically, with reference to FIG. 2, a 2S/1M ABS system on a semi-trailer 10 is illustrated. This means that the system utilizes two (wheel speed) sensors and one modulator. This type of system is the minimum currently required by applicable regulations on U.S. semi-trailers and currently comprises the majority of installations on new trailers. Most aspects of such a system will be familiar to those skilled in the art.

The diode 20 depicted, among other functions, provides some protection against mis-wiring. Typically a 5-volt regulator 22 is required to operate the various low power circuits on the circuit board.

Typically variable reductance (VR) wheel speed sensors 24 generate approximately sinusoidal signals with frequency proportional to wheel speed. These signals are converted to square waves by suitable interface blocks. The square waves are then presented to capture inputs on a microcontroller or digital signal processor (DSP) 26. The processor time stamps the square wave edges and these timestamps become the inputs for the ABS control software. Control outputs for a one modulator system typically operate two solenoids 28 as shown.

The solenoids 28 are part of a pressure modulator 34 that typically has three states; inactive, pressure fall and pressure hold. Utilizing two on/off pneumatic solenoid valves 28 allows for the implementation of the three states. Ultimately, the controlled air pressure is the basis for the actual air pressure applied to the trailer brakes. Usually, what is known as a relay valve provides pneumatic amplification between the air supplied by the solenoid valves 28 and the air supplied to the brakes. Also, the pneumatic arrangement is usually such that the solenoid valves 28 cannot increase the air pressure above that demanded by the driver's braking action. In the absence of electrical power to the solenoids 28, the valve typically assumes the inactive state and does not interfere with the air pressure level (and so the braking level) demanded by the driver.

The so-called high side switch 30 provides switching action under the control of the processor 26. It provides connection or isolation between the power voltage rail and the common connection at the top of the two solenoids 28. In the configuration shown, it is typically not used for switching the solenoids 28 to provide the appropriate control actions. Instead it provides a fail safe backup in case either of the so-named low side switches 32 should fail to short circuit. The high side switch 30 may also participate in test switching of the solenoids 28 during the periods that control action is not required. The high side switch 30 may easily be implemented using the type of device known as a "Smart" metal oxide semiconductor (MOS), which are available from manufacturers such as Infineon and International Rectifier.

The low side switches 32 provide connection or isolation between the low sides of the two solenoids 28 and ground. Typically they are used to switch the solenoids 28 to provide the required control response. Such low side switches 32 may also participate in test switching of the solenoids 28 during the periods that control action is not required. Typically N-Channel metal oxide semiconductor field effect transistors (MOSFETS) would be used to implement these switches. Such N-Channel MOSFETS are available from manufacturers such as Vishay and International Rectifier.

The invention is shown as the addition of an accelerometer 12, the output of which is connected to an analog to digital input on the processor 26. It is essential that this device is so arranged that it provides sensitivity to vertical movement. For example, if the circuit board is mounted in the horizontal plane as shown in FIG. 1, then the sensitivity of the device must be perpendicular to the circuit board on which it is mounted. Typically this is referred to as being a Z-axis device. Such devices are available from, for example, VTI.

As noted, an estimate of weight is extracted by determining the frequency of the acceleration signal. This estimate is used to enhance the quality of the control outputs to the solenoids 28. For example, if it is known that the rear of the semi-trailer 10 is approximately fully loaded then the control algorithm can allocate more time to the no-control state which actually provides a pressure increase function during the periods that the driver has over braked for the conditions and ABS control is active. As will be understood by those skilled in the art, transitions between the pressure decrease state and the pressure increase state can occur earlier if it is known that the rear of the trailer 10 is loaded. This helps to reduce stopping distance in the loaded condition.

The complete circuit, of course, includes many other components which are required for the practical implementation of such a system. Considerable extra design complexity is also dictated by the fail-safe requirements for such systems, which are not part of the present invention.

The method of the subject invention may be utilized with suspension systems having springs made of metallic material, such as steel, or non-metallic materials such as plastic or carbon fiber materials.

The vertical frequency oscillation of a semi-trailer 10 as measured by the vertical axis accelerometer 12 of the present invention will, of course vary depending on a number of factors. It may, generally be said, however, that a low frequency oscillation is an indicator of a heavy load. Conversely, a high frequency oscillation is an indicator of a light load. For purposes of the invention frequencies of from 0.5 to 15 Hz may be potential indicators.

While the above has discussed the applicability of the invention for a semi-trailer, those skilled in the art will readily appreciate that the present invention is equally suited for trucks, tractors, full trailers and any other vehicle designed to move a variable load. A full trailer is a trailer having at least one axle adjacent a forward portion of the trailer and at least one axle adjacent a rearward portion of the trailer.

The present invention is also adaptable for use with a dolly. Those skilled in the art recognize that a dolly is a removable axle that may be used on the forward portion of a semi-trailer when it is desired to attach that trailer to a semi-trailer pulled by a tractor. The trailer with the dolly and the semi-trailer together are typically referred to as a double in the industry.

By way of example only, an electronic control module may be mounted on the tractor, on the first semi-trailer directly behind the tractor, such as shown and described above, on or near the dolly and/or on the second trailer behind the first trailer. Those skilled in the art will appreciate that a similar arrangement can be made for vehicles referred to as triples. Other combinations, such as a tractor with a module and a semi-trailer with a module, are also within the scope of the present invention.

It will be appreciated that the above descriptions are intended to serve only as examples, and that many other embodiments are possible within the spirit and the scope of the present invention.

What is claimed:

1. A method of determining the sprung weight of at least a portion of a vehicle, comprising:
   providing an electronic control module mounted on the vehicle, the vehicle having a suspension system on at least a portion thereof comprising one or more springs, wherein the one or more springs have an essentially constant spring rate;
   estimating a vertical oscillation frequency of at least a portion of the vehicle with at least one pre-existing accelerometer mounted within the electronic control module; and
   utilizing the vertical oscillation frequency estimate, received only from the accelerometer mounted within the electronic control module, along with the essentially constant spring rate of the one or more springs of the suspension of the vehicle in the electronic control module to estimate a sprung weight of at least a portion of the vehicle.

2. The method defined in claim 1, wherein the one or more springs are comprised of a metal.

3. The method defined in claim 1, wherein the one or more springs are comprised of a non-metallic material.

4. The method defined in claim 1, wherein the one or more springs comprise multi-rate or multi-stage springs.

5. The method defined in claim 1, wherein the electronic control module comprises one or more of an ABS module, an EBS module, a suspension control module and a roll over module.

6. The method defined in claim 1, wherein the accelerometer is a component of the primary electronic circuit board in the electronic control module.

7. The method defined in claim 1, wherein the vehicle is a semi-trailer.

8. A method of determining the sprung weight of at least a portion of a vehicle, comprising:
   providing an electronic control module mounted on the vehicle wherein at least a portion of the vehicle has a metal spring suspension;
   estimating a vertical oscillation frequency of at least a portion of the vehicle with at least one pre-existing vertical axis accelerometer mounted within the electronic control module; and
   utilizing the vertical oscillation frequency estimate, received only from the accelerometer mounted within the electronic control module, along with a predetermined spring rate of the vehicle metal spring suspension in the electronic control module to estimate a sprung weight of at least a portion of the vehicle.

9. The method defined in claim 8, wherein the sprung weight is continuously estimated while the vehicle is in motion.

10. The method defined in claim 8, wherein the vertical axis accelerometer comprises a component of an electronic circuit board contained in the electronic control module.

11. The method defined in claim 8, wherein a low frequency oscillation measured by the vertical axis accelerometer comprises an indicator of a heavy load.

12. The method defined in claim 11, wherein a high frequency oscillation measured by the vertical axis accelerometer comprises an indicator of a light load.

13. The method defined in claim 8, wherein the vehicle is a semi-trailer.

* * * * *